United States Patent Office 3,547,583
Patented Dec. 15, 1970

3,547,583
PROCESS FOR THE ENTRAPMENT OF SULFUR DIOXIDE GAS
Harold W. Wilson, El Paso, Tex., assignor to The Golden Cycle Corporation, a corporation of West Virginia
No Drawing. Filed Jan. 2, 1968, Ser. No. 694,848
Int. Cl. C01b 17/04
U.S. Cl. 23—205                                       15 Claims

ABSTRACT OF THE DISCLOSURE

Sulfur dioxide gas, or waste gases containing sulfur dioxide gas in combination with other gases or gaseous substances, water vapor, acidic vapors containing sulfur such as sulfurous and sulfuric acids, and particulate solid or vaporous sulfur, and particulate solid matter, all in combination as "waste stack gases" is passed into an aqueous system in which finely divided metallic oxides and metallic silicates are held in suspension.

---

The present invention relates to the utilization of sulfur dioxide and acidic sulfur dioxide-containing gases emitted as wastes and air pollutants comonly referred to as "waste stack gases" such as during the processing of sulfide ores and in the burning of sulfur-containing coals, for example. More particularly, the present invention relates to a proces for the entrapment of sulfur dioxide gas in waste stack gases by the utilization of a combination of mixed metallic oxides and metallic silicates. More specifically, the present invention relates to a wet process for the separation and recovery of sulfur dioxide from sulfur dioxide and acidic sulfur dioxide-containing waste stack gases and whereby the sulfur dioxide recovered may be utilized as such, converted into elemental sulfur, or converted into sulfuric acid.

It is an object of the present invention to provide an economically feasible process for the entrapment of sulfur dioxide from waste stack gases by the utilization of mixtures of mixed metallic oxides and metallic silicates such as readily available in the form of waste solids, i.e. slag resulting from the reverberatory refining of copper pyritic type ores whereby a sulfur dioxide containing system is produced from which sulfur dioxide may be readily recovered or which sulfur dioxide-containing system may be further processed for the recovery of elemental sulfur therefrom.

Another object of the present invention is to provide a wet process as set forth hereinabove wherein the sulfur dioxide separated from the waste stack gases, and generally existing in the form of sulfurous acid, can be reacted with hydrogen sulfide gas, which comprises another readily availablew aste gas, thereby resulting in the reducing of the sulfur content of the waste stack gases to elemental sulfur thereby providing an economical means for combating air pollution by the entrapment of harmful and noxious waste gases.

Still another object of the present invention is to provide a process for the entrapment of sulfur dioxide from sulfur dioxide-containing waste stack gases whereby the waste gas containing sulfur dioxide gas in combination with other gases or gaseous substances, water vapor, acidic vapors containing sulfur such as in the form of sulfurous and sulfuric acids, particulate solid or vaporous sulfur, and other particulate solid matter is passed into, i.e., through, an aqueous suspension of a mixture of fine particles of metallic oxides and metallic silicates whereby the sulfur dioxide-containing gas brings about the formation of sulfurous acid together with adsorption of some of the sulfur dioxide gas by other moieties of the metallic oxides and metallic silicates present. Regulation of the quantity or rate of sulfur dioxide-containing gas entering the system together with ap reselected "deficiency" or "surplus" of water brings about a controlled dehydration of dehydrated silicic acid produced by the dissolving action of the sulfurous acid produced on the metallic oxides and silicates. Controlled pasage of the sulfur dioxide into the system permits control of the pH of the system whereby the system can be converted, by continued dehydration of the dihydrated silicic acid to hemihydrated silicic acid, into a gel containing chemically and physically combined sulfur dioxide or the system may be maintained in a liquid state by preventing dehydration of the dihydrated silicic acid whereby its content of undissolved slag solids can be mechanically removed to leave a solids-free liquid containing soluble metallic sulphito salts, sulfurous acid, and dihydrated silicic acid to be further processed to obtain sulfur in the elemental state.

Other objects and aspects of the present invention will become apparent from the discussion following hereinafter.

In brief, the novelty of the present invention will be most readily appreciated from a consideration of the controlled utilization of varying quantities of sulfur dioxide, preferably from a waste source thereof such as sulfur dioxide-containing waste stack gases for example, to produce in the presence of siliceous substances, such as waste slags resulting from the reverberatory refining of copper pyritic type ores, in the presence of water, either a gel consisting predominantly of elemental sulfur, sulfite sulfur compounds, hemihydrated silicic acid together with metal silicate-adsorbed sulfur dioxide gas and water or a solution of sulfurous acid containing predominantly soluble sulfite sulfur salts, dihydrated silicic acid, and adsorbed as well as absorbed sulfur dioxide gas. The gel or solution obtained can have its major content of sulfur reduced to elemental form by subjecting such gel or solution to hydrogen sulfide gas, such as comprising waste hydrogen sulfide gas or hydrogen sulfide gas formed in situ by introducing pyritic materials and mineral acid solutions into either the gel or the solution. In the latter case the sulfide sulfur moeity also enters into reaction whereby it is for the most part converted into the elemental state. Alternatively, the prepared gel, whether taken from storage after having been freed of all but approximately 10% to 20% of its moisture, or processed immediately after jellification, is heated to a temperature ranging from about 450° F. to 650° F. to effect the release of its content of chemically and physically combined sulfur dioxide for use as sulfur dioxide per se or for its conversion into sulfuric acid by use of presently known processes. Furthermore, if it is desired to process the gel to obtain elemental sulfur the gel can be gassed with hydrogen sulfide gas to bring about the formation of elemental sulfur and wherein the gassed gel can be subjected to a sulfur extraction procedure to separate and thus recover its content of elemental sulfur. In addition, the prepared gel, whether after its immediate preparation, or after having been stored with or without drying, or after having been dried, may be intimately mixed with pulverized pyritic material such as iron pyrites or copper-iron pyrites followed by acidification with an aqueous mineral acid solution such as of hydrochloric acid, for example, and wherein the acidified mixture may be allowed to stand in an aggregate pile over a period of time to permit chemical reaction to occur, or it may be treated with steam to accelerate chemical reaction to cause the formation liberation of elemental sulfur which can be recovered either by a hot aqueous or organic solvent extraction procedure.

With further regard to the metallic oxides and metallic silicates which can be utilized in carrying forth the process of the present invention, a great number of naturally occurring mineral substances can be used and wherein the following are examples of such mineral substances which are reactable with aqueous solutions of mineral acids to form salts and hydrates of silicic acid as the products of reaction:

Helvite: $3(Fe,Mn)O \cdot MnS \cdot 3BeO \cdot 3SiO_2$;
Allanite: $4(Ca,Fe)O \cdot 3(Al,Ce,Fe,Bi)_2O_3 \cdot 6SiO_2$;
Iolite: $4(Mg,Fe)O \cdot 4Al_2O_3 \cdot 10SiO_2 \cdot H_2O$;
Anorthite: $4FeO \cdot CaO \cdot Fe_2O_3 \cdot 4SiO_2 \cdot H_2O$;
Ilvaite: $CaO \cdot Al_2O_3 \cdot 2SiO_2$; and
Chrysolite: $2(Mg,Fe)O \cdot SiO_2 \cdot H_2O$; etc.

Additionally, mixtures of combination of metallic oxides and metallic silicates of either natural or synthetic origin can be employed. For example, synthetically prepared ferrous oxide FeO can be admixed with synthetic wollastonite $CaSiO_3$ and with naturally occurring olivine Mg, Fe $SiO_4$ in ratios of about 3 parts by weight of the ferrous oxide to 1 part by weight of each of the ferrous content olivine and the calcium silicate of the wollastonite to produce a highly suitable combination of oxide-silicate material for use in this process.

The mixture of metallic oxides and metallic silicates preferred for use in this process comprises a combination, by weight, of approximately 3 parts of ferrous oxide to 2 parts of ferrous silicate $FeSiO_3$ to 1 part of any one of or combination of oxides and/or silicates of calcium, magnesium, aluminum, and manganese. However oxide and silicate groups attached to any of the metals of Group VIII, and metals of Group I-A and Group I-B of the Periodic Table, along with calcium, magnesium, and manganese are suitable for use in the proposed process.

Since natural mineral substances must first be located, then mined and processed for use, and their composition is usually highly variable, it is preferred to use waste materials presently existing in large aggregate piles, which waste materials are relatively homogeneous in their contents of chemically combined metallic oxides and metallic silicates which materials are commonly referred to as "waste smelter slags" such as those derived as wastes from pyrometallurgically refining pyritic ores of copper.

Such waste slags are identified by the following typical analysis:

|  | Percent |
|---|---|
| Silicon dioxide, present as mixed silicates of iron, calcium magnesium, and aluminum | 32–38 |
| Iron, present predominantly as ferrous oxide and ferrous silicates | 28–32 |
| Calcium oxide, present as silicate | 8–10 |
| Aluminum oxide, present as silicate | 6–8 |
| Copper, present as metal and oxide | .1–.5 |
| Lead, present as metal | 0–.5 |
| Sulfur, present in sulfide form | 0–1 |

More particularly, when a ratio by weight of approximately 1 part of pulverized metallic oxides-metallic silicates, as set forth hereinabove, are mixed with approximately 2.5 to 7 parts by weight of water, a moderately alkaline system, pH 8–9, results which is caused by hydrolysis of the alkaline base compounds, i.e., basic calcium and magnesium oxides and silicates, as illustrated by the following typical equation:

$$CaSiO_3 + 3H_2O \rightarrow Ca(OH)_2 + H_4SiO_4$$

When sulfur dioxide-containing gas is passed into the above described moderately alkaline system the system becomes strongly acidic as a result of the formation of sulfurous acid, which in turn causes some of the system's content of metallic oxides and metallic silicates to be dissolved and to be converted into metal sulphito salts. Other of the metallic oxides and metallic silicates present adsorb some of the sulfur dioxide gas entering the system. It will thus be appreciated that the system chemically and physically attracts sulfur dioxide gas.

With the continuing entry of sulfur dioxide gas into the system, a continuation of dissolution of metallic oxides and silicates by the dissolving action of the sulfurous acid being formed brings about the formation of dihydrated silicic acid.

With a relative deficiency of water in the system, i.e. a proportion of slag to water at the lower end of the above set forth slag to water proportion range, such as 1 part of slag to approximately 2.5 to 4 or 5 parts of water, or when the quantity of sulfur dioxide gas passed into the described system is relatively slowly introduced such that the pH of the system remains above a value of 3.5, i.e., within a range of pH 3.5 to pH 7.0 for example, the viscosity of the aqueous metallic oxide-metallic silicate system increases as a result of partial dehydration of the aforementioned dihydrated silicic acid formed to the monohydrated silicic acid form and whereby the combination of heat contributed by the entering sulfur dioxide gas, heats of solution, reaction, absorption, and adsorption, portions of the dihydrated silicic acid are converted into monohydrated silicic acid which becomes dehydrated to the extent that it becomes hemihydrated silicic acid at which point the system jells. Additional moieties of sulfur dioxide gas may be passed into this jelled system and be trapped by being adsorbed by the hemihydrated silicic acid to the extent that the gel becomes a semi-rigid solid after which no more gas would be passed into the system.

The aforementioned gel can be processed immediately for the recovery of sulfur therefrom, in the form of elemental sulfur or sulfur dioxide, or alternatively the gel may be dried to a free moisture content of approximately 10% to 20% water and stored in this state for future processing for the recovery of the sulfur therefrom. It will thus be appreciated that when the method of the present invention is being carried forth for the abatement of air pollution by the treatment of waste stack gases a plurality of contact vessels, arranged in parallel, would be sequentially utilized thereby always having at least one contact vessel available for the entrapment of sulfur dioxide and the like from waste stack gases passing therethrough to an off-gas stack.

If it is desired to recover the sulfur content of the aforementioned gel in the form of sulfur dioxide, i.e., such as to be utilized for the production of sulfuric acid, the prepared gel whether processed immediately or taken from storage after having been freed of a portion of its free moisture content as set forth above is heated to a temperature ranging from about 450° F. to 650° F. whereby the release of its content of chemically and physically combined sulfur dioxide is effected.

If it is desired to recover the sulfur content of the aforementioned gel in the form of elemental sulfur, the moist gel or gel dried as mentioned hereinabove rehydrated to approximately 20% to 30% may be gassed with hydrogen sulfide gas, i.e. such as a waste hydrogen sulfide gas, or alternatively gassed with hydrogen sulfide gas produced in situ by intimately mixing pulverized pyritic material such as iron pyrites or copper-iron pyrites with the gel followed by acidification with an aqueous mineral acid solution.

With regard to the former mode of gassing the gel the following equations are considered typical:

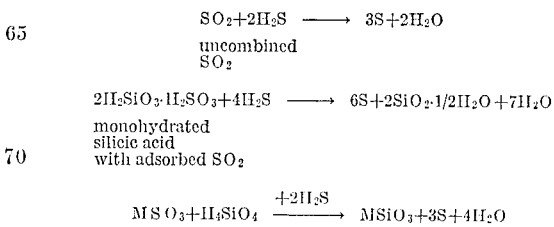

M represents metals of Group 8 and metals of the 1st and 2nd sub groups of the periodic table plus calcium, magnesium, and manganese, but ferrous iron predominantly.

Additional to metallic sulfites entering this reaction double sulfites or sulphito salts such as the following also enter into such reactions:

$$(M(SO_3)_2)H_2 \text{ and } (M(SO_3)_4)H_6$$

The hydrogen sulfide gassed gel can be treated with boiling water to effect a separation and recovery of its content of elemental sulfur, or the gassed gel can be dried and the elemental sulfur content thereof separated therefrom with suitable organic sulfur solvents such as benzene, toluene from which the elemental sulfur can be recovered in a state of relatively high purity by evaporating off the solvent to leave a residue of elemental sulfur and wherein the solvent vapors may be condensed and collected for reuse.

In the latter mode of gassing the gel, by the in situ production of hydrogen sulfide gas, pyritic materials are combined with the gel and the mixture is acidified with a mineral acid, i.e., hydrochloric acid, sulfuric acid. The following equation is considered typical of treatment in this manner with iron pyrite and hydrochloric acid:

$$\frac{4H_2SiO_3 \cdot SO_2 + MSO_3 + (M(SO_3)_4)H_6}{\text{Gel System}} + \frac{18Fe_2S_3}{\text{Pyrite}}$$

$$+ \frac{36 \text{ HCl}}{\text{Acid}} \rightarrow 2MSiO_3 + 2SiO_2 \cdot \tfrac{1}{2}H_2O + 18FeCl_2$$

$$+ 18FeS_2 + 27S + 24H_2O$$

When the gel-pyrite system is acidified with mineral acid a temporary sacrifice of the condition of negative catalysis is made for the purpose of forming hydrogen sulfide from the reaction of the mineral acid with the pyritic material introduced. However, the strong state of reduction created by the high concentration of hydrogen sulfide generated returns the system to a state of low concentration of free hydrogen ions brought about by the reduction of the sulfur of the sulfurous acid with attendant rapid formation of elemental sulfur, metal oxides, and water. To recover the elemental sulfur from the foregoing system it is merely necessary to utilize a conventional solvent extraction procedure as briefly discussed hereinabove.

With more particular regard to the entrapment of sulfur dioxide from sulfur dioxide-containing waste stack gases by utilization of an aqueous mixed metallic oxide-metallic silicate system, and wherein it is desired to generally preclude jellation of the system, the ratio of metallic oxides-metallic silicates to water is higher than when a gel system is desired and accordingly the proportion is one which is in the upper portion of the proportion range set forth hereinabove, i.e. 1 part of metallic oxides-metallic silicates to approximately 5 to 7 parts by weight of water. In addition, when carrying forth the process of the present invention without bringing about the initial jellation of the system the initial alkaline system resulting from the hydrolysis of the alkaline earth compounds present, as set forth hereinabove, is quickly brought to a pH of below 3.5, preferably below approximately pH 3.0 by the introduction of sulfur dioxide-containing gas at a faster rate than when jellation of the system is desired, whereby practically no dehydration of the dihydrated silicic acid takes place and thus no significant thickening, i.e., viscosity increase, occurs. At this point, the system may be mechanically treated to effect separation of undissolved solids such as by conventional filtration, centrifugal or gravity separation procedures so as to leave a substantially solids-free liquid which contains soluble metallic sulphito salts, sulfurous acid and dihydrated silicic acid which may be further processed to recover the sulfur content thereof in the form of elemental sulfur.

Thus, when the process comprising the present invention is primarily intended to recover sulfur dioxide from waste stack gases in the form of elemental sulfur, and where the total entrapment of the sulfur dioxide gas from the waste gas being passed to an off stack is of secondary importance, it has been found preferable to generally preclude the jellation of the aqueous mixed metallic oxide-metallic silicate system. At the termination of passage of the sulfur dioxide-containing gas into the aqueous system, which contains no evidence of jellation, the insoluble solid matter present, which generally amounts to approximately one-half of the pulverized metallic oxide-metallic silicate material processed, is separated from the liquid portion of the system which liquid consists of an aqueous sulfurous acid solution containing dissolved salts of ferrous sulfite and ferrous acid sulfite predominantly, with lesser amounts of sulfurous acid salts of calcium, magnesium and aluminum and other acid dissolved metals formerly present in the mixed metallic oxide-silicate material processed.

The above liquid system of sulfurous acid insoluble sulfite salts is further processed with hydrogen sulfide gas to recover the sulfur content thereof in the form of elemental sulfur as shown by the following typical equation:

$$H_2SO_3 + 2H_2S \rightarrow 3S + 3H_2O$$

The instant at which all of the uncombined sulfurous acid present has reacted with the hydrogen sulfide gas being passed into the solution is indicated by a reduction of ionizable hydrogen shown by a rise in the pH and by the momentary formation of a black precipitate of ferrous sulfide as indicated by the reaction shown below:

$$FeSO_3 + H_2S \rightarrow FeS + H_2SO_3$$

At this point, to expedite dissolution of the metal sulfites and to dissolve any sulfides that may have formed, the system is strongly acidified with either hydrochloric or sulfuric acid which permits formation of an additional moiety of sulfurous acid to be reduced by the hydrogen sulfide gas entering the system while at the same time allowing the metal ions of the sulfites and acid sulfites to combine to form soluble chloride and/or sulfate salts to force the reaction to completion as shown below as when using hydrochloric acid as the acidification agent:

$$FeS + 2HCl \rightarrow FeCl_2 + H_2S$$

$$FeSO_3 + 2HCl + 2H_2S \rightarrow FeCl_2 + 3S + 3H_2O$$

$$Ca(HSO_3)_2 + 2HCl + 4H_2S \rightarrow CaCl_2 + 6S + 6H_2O$$

The ferrous chloride formed in turn reacts with the sulfurous acid present as shown by the following typical equation:

$$4FeCl_2 + H_2SO_3 + 4HCl \rightarrow 4FeCl_3 + S + 3H_2O$$

The amount of hydrochloric or sulfuric acid required is pre-calculated so as to have a stoichiometric quantity of ions available to completely react with the acid soluble metal ions present in the sulfurous acid solution of sulfite salts obtained from treating a set amount of pulverized mixed metallic oxides and metallic silicates. A summary equation illustrating the overall reactions between ferrous sulfite, sulfurous acid, hydrogen chloride, and hydrogen sulfide are shown below:

$$2FeSO_3 + H_2SO_3 + 6HCl + 5H_2S \rightarrow 2FeCl_3 + 8S + 9H_2O$$

A summary equation illustrating the overall reaction between the ferrous oxide and ferrous silicate with the sulfur dioxide gas followed by acidification with sulfuric acid and treated with hydrogen sulfide gas is shown below:

$$FeO + FeSiO_3 + 2SO_2 + 2H_2SO_4 + 4H_2S \rightarrow$$
$$2FeSO_4 + 6S + H_2SiO_3 + 5H_2O$$

Inspection of the above equation will show that 192 parts by weight of sulfur is separated in elemental form as a result of treating the ferrous oxide and silicate with the combination of sulfur dioxide, hydrogen sulfide and sulfuric acid. As with the embodiments of the process of the present invention discussed hereinabove the elemental sulfur present in the foregoing system may be recovered by conventional solvent extraction procedures.

As with the jelled system, the non-jelled system can be effectively gassed with hydrogen sulfide gas formed in situ, as discussed briefly hereinabove, by introducing pyritic materials, i.e., iron pyrite, and mineral acid solutions into the non-jelled system whereby a substantial portion of the sulfur content of the system may be separated for subsequent recovery in the form of elemental sulfur.

The following exemplary examples are included to more specifically illustrate exemplary modes of carrying forth the process comprising the present invention.

EXAMPLE I

Approximately 200 grams of finely pulverized mixed metallic oxides-metallic silicates (of a general composition as set forth hereinabove) which has been ground to a fineness such that at least 90% of it passed through a 200 mesh U.S. Standard sieve were added to approximately 500 cc. of water in a suitable reaction vessel. The pulverized material will hereinafter be referred to as pulverized slag. The pulverized slag-water system was mechanically agitated to the extent that the slag particles were kept in a constant state of motion while waste stack gas containing sulfur dioxide was passed into the system of suspended slag particles-in-water. The sulfur dioxide-containing gas was passed into the slag-water system at a uniform rate such that a total of approximately one gram mol of sulfur dioxide entered the system during a time period of about one and one-half hours, during which time period the pH of the system was maintained at approximately 3.5 to 4.0 after which the system was observed to jell. The gel obtained was force dried to a free moisture content of approximately 13% after which chemical analysis showed it to have a content of 21.9% sulfur dioxide of which it was determined approximately 77% was present in the form of metallic sulfites and metallic acid sulfites and 23% present as silicic acid adsorbed sulfur dioxide, hydrolyzable to sulfurous acid.

EXAMPLE II

The procedure set forth in Example I was repeated with the exception that the gel obtained was not force dried, thus resulting in a gel system having a moisture content in the order of about 70%.

EXAMPLE III

Approximately 100 grams of the dried gel, obtained as set forth in Example I, was omistened with approximately 10 cc. of water and gassed with approximately 22 grams of hydrogen sulfide gas. The resultant system was extracted with toluene to separate the elemental sulfur present therein and the elemental sulfur so extracted was recovered by evaporation of the toluene whereby a residue of elemental sulfur weighing approximately 28 grams was obtained.

EXAMPLE IV

Approximately 500 grams of the moist gel, obtained as set forth in Example II, was gassed with approximately 22 grams of hydrogen sulfide gas. The resultant system was processed for the separation of the elemental sulfur therefrom by the utilization of a toluene extraction procedure and wherein a residue of elemental sulfur weighing approximately 28 grams was obtained subsequent to the evaporation of the toluene from the solvent fraction.

Alternatively, it will be appreciated that the embodiments of Examples III and IV can be carried forth with the utilization of hydrogen sulfide gas produced in situ by the reaction of pyritic material, i.e., iron pyrite with a mineral acid solution, i.e., hydrochloric acid, or sulfuric acid, as set forth hereinabove.

EXAMPLE V

Approximately 5 gram mols or about 320 grams of sulfur dioxide gas were passed at a uniform rate, during a 30 minute time period, into a finely pulverized copper waste slag-water system containing approximately 500 grams of the pulverized slag in suspension in approximately 3,000 cc. of water, which system was continuously mechanically agitated. The moderately alkaline initial system dropped below a pH of approximately 3.5, more specifically, to a pH of approximately 2.7, within approximately one minute of the time of initial entry of the sulfur dioxide gas and the system was maintained at a pH value below 3.0 during the entire 30 minutes during which the gas was passed into the system. At the time of termination of passage of the sulfur dioxide-containing gas into the noted system, which contained no evidence of dehydration of the dihydrated silicic acid, no gel formed, the insoluble solid matter present, which amounted to approximately one-half of the pulverized slag processed, was separated from the liquid to yield a solution containing dissolved salts of ferrous sulfite and ferrous acid sulfite predominantly, with lesser amounts of sulfurous acid salts of calcium, magnesium, aluminum and other acid dissolved metals formerly present in the slag processed.

EXAMPLE VI

The liquid system, obtained as set forth in Example V, comprising a solution of sulfurous acid and soluble sulfite salts was further processed with hydrogen sulfide gas to effect recovery of the sulfur content thereof in the form of elemental sulfur and wherein upon initial exhaustion of uncombined sulfurous acid therein the system was strongly acidified with a mineral acid thereby bringing about the formation of an additional moiety of sulfurous acid to be reduced to elemental sulfur by the hydrogen sulfide gas entering the system. The system was then extracted with a suitable solvent to effect recovery of the elemental sulfur therefrom.

EXAMPLE VII

A solution of sulfurous acid and soluble sulfite salts, obtained as set forth in Example V, was treated for the separation and recovery of the sulfur content thereof in the form of elemental sulfur by the in situ production of hydrogen sulfide gas produced as a result of reaction between pyritic material, iron pyrite and a mineral acid, i.e., hydrochloric acid, sulfuric acid, and the resulting system extracted with a suitable solvent for sulfur to effect recovery of elemental sulfur therefrom subsequent to evaporation of the sulfur solvent from the solvent phase.

Although not specifically set forth hereinabove in the specific examples it will nevertheless be understood that the nature of the reaction occurring when utilizing pyrite and acid for the in situ production of hydrogen sulfide gas in such that the system must generally be permitted to stand in an aggregate pile over a period of time to permit the chemical reaction to go to completion or alternatively the system may be treated with steam to accelerate chemical reaction to cause the liberation of elemental sulfur which can be isolated, as set forth hereinabove, by floating off with boiling water or by organic solvent extraction processes.

Furthermore, the gel obtained as in Examples I or II may be heated to a temperature of approximately 450° F. to 650° F. to drive off, such as for use in a subsequent process, its chemically and physically combined content of sulfur dioxide.

In summary, from the foregoing, it will be apparent that the use of a variable quantity of sulfur dioxide, or the utilization of an amount of sulfur dioxide per unit of material being treated over varying periods of time, and also preferably including the predetermined "deficiency" or "surplus" of water, permits the recovery of sulfur dioxide from waste stack gases to produce in the presence of siliceous substances, such as waste slags, either a gel consisting predominantly of elemental sulfur, sulfite sulfur compounds, and silicic acid as well as metal silicate-adsorbed sulfur dioxide gas and water or a system comprising a solution of sulfurous acid containing predominantly soluble sulfite sulfur salts, dihydrated silicic acid, adsorbed and absorbed sulfur dioxide gas.

The gel or solution obtained can have its major content of sulfur reduced to elemental form by subjecting such gel or solution to exposure to hydrogen sulfide gas, i.e., waste hydrogen sulfide gas, or hydrogen sulfide gas formed in situ by introducing pyritic materials and mineral acid solutions into either the gel or the solution previously obtained with such sulfide sulfur itself entering into the reaction and also being converted into the elemental state for the most part. Thus, it will be apparent that the present invention is highly suitable for the conservation of matter afforded by its use in accomplishing the recovery of elemental sulfur from waste slag and waste gases while providing at the same time an economical means for combating air pollution by the entrapment of harmful and noxious sulfur dioxide and hydrogen sulfide waste gases.

The foregoing is considered as illustrative only of the principles of the invention. Further, since numerous modifications and changes in the several exemplary modes set forth will readily occur to those skilled in the art, it is not desired to limit the invention to the specific examples set forth, and accordingly all suitable modifications and equivalents may be resorted to falling within the scope of the invention as claimed.

What is claimed as new is as follows:

1. A wet process for the separation and recovery of a sulfur moiety from sulfur dioxide-containing waste stack gases which comprises:
   (a) preparing an aqueous suspension comprising as an essential component a mixture of finely divided particulate mineral acid rectable alkaline earth metal containing by weight 3 to 4 parts of mixed metallic oxides and 2 to 3 parts of silicates, said oxides and silicates selected from the group of oxides and silicates of the metals of Group I-A, Group I-B, Group VIII, Ca, Mg and Mn, said suspension having a pH of about 8 to 9;
   (b) passing a sulfur dioxide-containing waste stack gas into said suspension while agitating the said suspension to bring about the formation of sulfurous acid and the conversion of moieties of said metallic oxides and silicates into sulphito salts and dihydrated silicic acid by the so formed sulfurous acid and other moieties of the metallic oxides and silicates to adsorb an additional moiety of the sulfur dioxide from the waste stack gas;
   (c) continuing passage of the waste stack gas into the acidified aqueous system to bring about the formation of dihydrated silicic acid;
   (d) continuing the introduction of sulfur dioxide-containing waste stack gas to provide a sulfur enriched jelled system; and
   (e) contacting the sulfur enriched system obtained with a reducing gas to recover at least a portion of the sulfur as elemental sulfur.

2. The process of claim 1 wherein step (d) includes introducing sufficient sulfur dioxide-containing waste stack gas to dehydrate a moiety of the dihydrated silicic acid to monohydrated silicic acid and then to hemihydrated silicic acid at which point the system jells.

3. The process of claim 1 wherein in step (a) the particulate material is in the order of about 200 mesh U.S. Standard.

4. The process of claim 1 wherein in step (a) the aqueous suspension comprises, on the basis of weight, about 1 part metallic oxides-metallic silicates to about 5 to 7 parts water.

5. A wet process for the separation and recovery of a sulfur moiety from sulfur dioxide-containing waste stack gases which comprises:
   (a) preparing an aqueous suspension comprising as an essential component a mixture of finely divided particulate mineral acid reactable alkaline earth metal containing by weight 3 to 4 parts of mixed metallic oxides and 2 to 3 parts of silicates said oxides and silicates selected from the group of oxides and silicates of the metals, of Group I-A, Group I-B, Group VIII, Ca, Mg and Mn, said suspension having a pH of about 8 to 9;
   (b) passing a sulfur dioxide-containing waste stack gas into said suspension while agitating the said suspension to bring about the formation of sulfurous acid and the conversion of moieties of the metallic oxides and silicates into sulphito salts and dihydrated silicic acid by the so formed sulfurous acid and other moieties of the metallic oxides and metallic silicates to adsorb an additional moiety of sulfur dioxide from the waste stack gas;
   (c) selectively controlling the quality and rate of passage of the sulfur dioxide-containing waste stack gas entering the system as set forth in (b) to control the dehydration of dehydrated silicic acid formed to provide a sulfur enriched system in a preselected state of jellation; and
   (d) contacting the sulfur-enriched system obtained with a reducing gas to recover at least a portion of the sulfur as elemental sulfur.

6. The process of claim 5 wherein in step (c) sufficient sulfur dioxide-containing waste stack gas is passed into the system to bring about the dehydration of a moiety of the dihydrated silicic acid to monohydrated silicic acid and then to hemihydrated silicic acid at which point the system jells.

7. The process of claim 5 wherein in step (a) the particulate material is in the order of about 200 mesh U.S. Standard and the suspension comprises, on the basis of weight, about 1 part metallic oxides-metallic silicates to about 5 to 7 parts water.

8. A wet process for the separation and recovery of a sulfur moiety from sulfur dioxide-containing waste stack gases which comprises:
   (a) preparing an aqueous suspension of finely divided alkaline earth metal containing mixed metallic oxide and mixed metallic silicate mixture waste smelter slag derived from pyrometallurgically refining pyritic ores of copper, said slag being about 200 mesh U.S. Standard, said suspension comprising, by weight, about 1 part slag to about 5 to 7 parts water and having a pH of about 8 to 9;
   (b) passing a sulfur dioxide-containing waste stack gas into said suspension while agitating the suspension until the pH of said suspension is reduced to about 2.7 to 3.2 whereby portoins of the metallic oxides and silicates are converted into sulphito salts and dihydrated silicic acid; and
   (c) utilizing remaining portions of the said oxides and silicates to absorb further $SO_2$ from said waste stack gas being passed into said suspension;
   (d) gassing the system with hydrogen sulfide gas to reduce at least a portion of the sulfur contents thereof to elemental sulfur; and
   (e) recovering the elemental sulfur from the gassed system obtained in (d).

9. The process of claim 8 wherein in step (c) the system being gassed with hydrogen sulfide is further acidified with mineral acid to bring about the formation of an additional moiety of sulfurous acid to be reduced to elemental sulfur by the hydrogen sulfide gas entering the system.

10. The process of claim 8 wherein acid insolubles present after step (b) are mechanically separated from the nonjelled system.

11. A wet process for the separation and recovery of a sulfur moiety from sulfur dioxide-containing waste stack gases which comprises:
   (a) preparing an aqueous suspension of finely divided alkaline earth metal containing mixed metallic oxide and mixed metallic silicate mixture comprising waste smelter slag derived from pyrometallurgically refining pyritic ores of copper, said slag being about 200 mesh U.S. Standard, said suspension comprising, by weight, about 1 part slag to about 5 to 7 parts water and having a pH of about 8 to 9;

(b) passing a sulfur dioxide-containing waste stack gas into said suspension while agitating the suspension until the pH of said suspension is reduced to about pH 3.5 to 7.0 whereby portions of the metallic oxides and silicates are converted into sulphito salts and dehydrated silicic acid;

(c) utilizing remaining portions of said oxides and silicates to absorb further $SO_2$ from said waste stack gas being passed into said suspension;

(d) selectively controlling the quantity and rate of introduction of sulfur dioxide-containing gas in (b) and (c) to bring about the dehydration of a moiety of the dihydrated silicic acid to monohydrated silicic acid and then to hemihydrated silicic acid at which point the system jells;

(e) gassing the system with hydrogen sulfide gas to reduce at least a portion of the sulfur contents thereof to elemental sulfur; and (f) recovering the elemental sulfur from the gassed system obtained in (e).

12. The process of claim 11 wherein the jelled system obtained in (c) is dehydrated to a free moisture content, on the basis of weight, of about 10% to 20% and subsequently rehydrated to about 30% free moisture prior to being treated as in (d).

13. The process of claim 11 wherein in step (d) the hydrogen sulfide gas is produced in situ by the addition of pyrites and an aqueous mineral acid solution to the jelled system obtained in step (c).

14. The process of claim 13 wherein in step (e) the gassed system is kept for a period of time at ambient temperature to reduce said moiety of sulfur to its elemental form.

15. The process of claim 13 wherein in step (e) the reduction of said moiety of sulfur to its elemental form is accelerated by subjecting the gassed system to the action of steam.

References Cited

UNITED STATES PATENTS

| | | | |
|---|---|---|---|
| 1,335,348 | 3/1920 | Patrick et al. | 23—178 |
| 1,895,724 | 1/1933 | Miller et al. | 23—225X |
| 1,917,689 | 7/1933 | Baum | 23—226 |
| 2,747,968 | 5/1956 | Pigache | 23—226X |
| 2,863,727 | 12/1958 | Thornhill et al. | 23—182 |
| 3,269,831 | 8/1966 | Wilson | 75—24X |
| 3,311,449 | 3/1967 | Atsukwa et al. | 23—182X |
| 3,418,238 | 12/1968 | Wilson | 252—317 |

OSCAR R. VERTIZ, Primary Examiner

G. O. PETERS, Assistant Examiner

U.S. Cl. X.R.

23—2, 178

UNITED STATES PATENT OFFICE
CERTIFICATE OF CORRECTION

Patent No. 3,547,583          Dated December 15, 1970

Inventor(s)      HAROLD W. WILSON

It is certified that error appears in the above-identified patent and that said Letters Patent are hereby corrected as shown below:

Column 6, line 16, cancel "insoluble" and substitute therefor --soluble--.

Signed and sealed this 28th day of March 1972.

(SEAL)
Attest:

EDWARD M.FLETCHER,JR.      ROBERT GOTTSCHALK
Attesting Officer            Commissioner of Patents